Dec. 21, 1954
A. EISELE
2,697,282
BORE GAUGE
Filed July 19, 1951
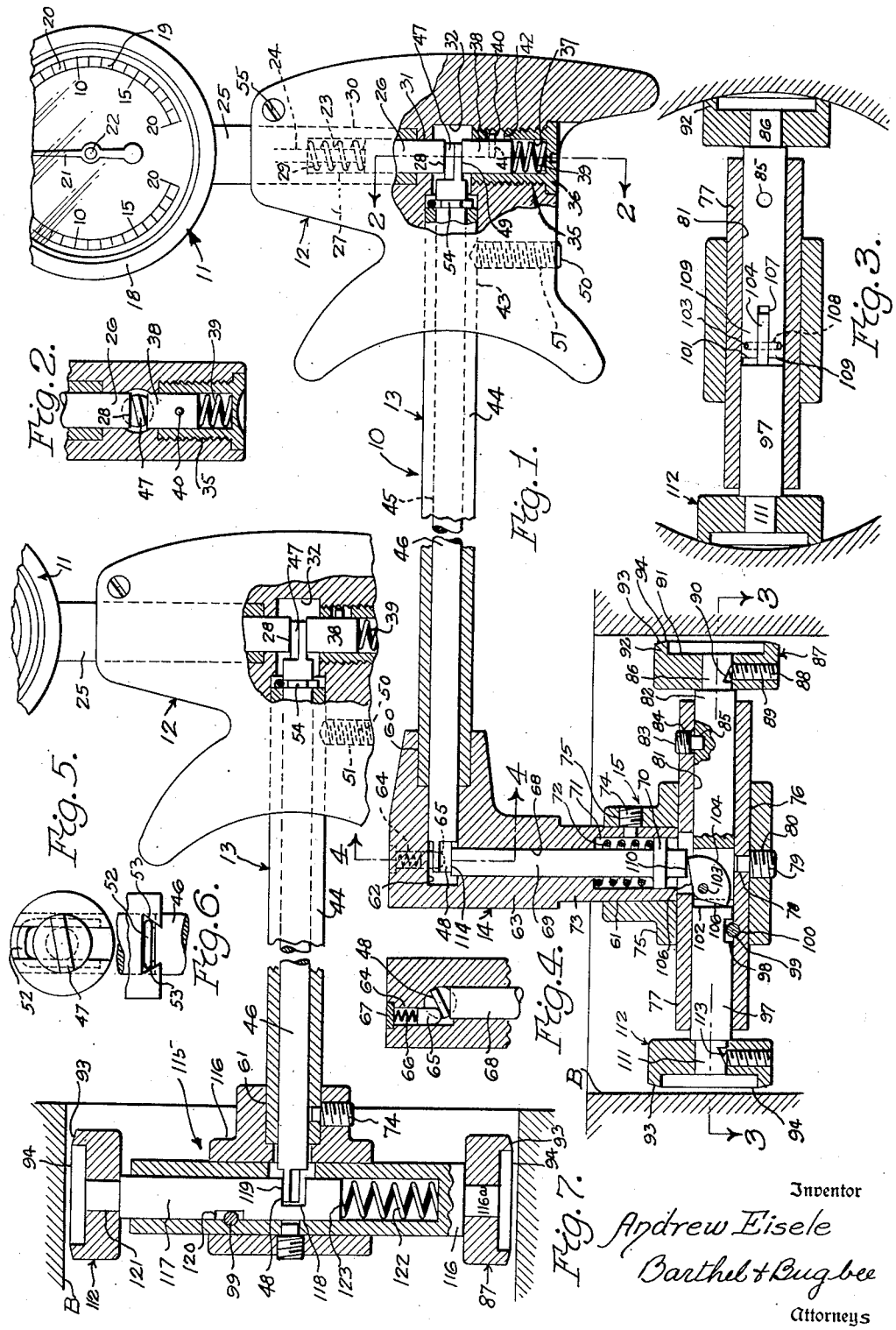
Inventor
*Andrew Eisele*
*Barthel & Bugbee*
Attorneys

United States Patent Office 2,697,282
Patented Dec. 21, 1954

2,697,282

BORE GAUGE

Andrew Eisele, Detroit, Mich.

Application July 19, 1951, Serial No. 237,629

4 Claims. (Cl. 33—178)

This invention relates to bore gauges.

One object of this invention is to provide a bore gauge having improved contact members for engaging the wall of the bore to be measured, thereby resulting in improved precision and greater resistance to wear.

Another object is to provide a bore gauge having an improved measuring head wherein the fixed and movable measuring pins terminate in knife-edged rings for contacting the bore wall to be measured, the motion of the movable measuring pin being transmitted to the motion-transmitting rod of the instrument by a pivoted sector or other mechanism which transmits rectilinear motions at right angles to one another.

Another object is to provide a bore gauge having improved means for taking up lost motion in the motion-transmitting mechanism so that the motion-transmitting mechanism will always precisely transmit the motion imparted to it from the movable measuring pin to the dial indicator employed for showing the measurement made.

Another object is to provide a bore gauge of the foregoing character which is convertible either into an offset bore gauge or a straight bore gauge wherein the measuring head may be turned through any desired angle without disturbing the measurements made thereby and adapting the bore gauge to the efficient measurement of bores in almost inaccessible locations.

Further objects and advantages of the invention will become apparent from the following description of the accompanying drawings, wherein:

Figure 1 is a side elevation, partly in section, of a bore gauge converted to its offset form by using the elbow attachment, and showing in section the motion-transmitting mechanism and the measuring head;

Figure 2 is a fragmentary longitudinal section showing the dial indicator connection, taken along the line 2—2 in Figure 1;

Figure 3 is a longitudinal section through the measuring head taken along the line 3—3 in Figure 1;

Figure 4 is a longitudinal section showing the lost motion take-up mechanism, taken along the line 4—4 in Figure 1;

Figure 5 is an end elevation of the motion-transmitting rod and its adjacent mechanism at its point of connection to the dial indicator, looking approximately in the direction of the arrows 2—2 in Figure 1;

Figure 6 is a top plan view of the mechanism shown in Figure 5;

Figure 7 is a fragmentary side elevation, partly in central vertical section of the bore gauge of Figure 1, converted to its straight form by removing the elbow attachment.

Referring to the drawings generally, Figures 1 and 7 show the combination offset and straight bore gauge, generally designated 10, according to one form of the invention, as consisting generally of a dial indicator 11 mounted in a handle 12 on one end of a tubular body 13, the opposite end of which carries an optional elbow attachment or adapter 14 which, when used (Figure 1) carries a rotatable measuring head 15 on its outer end. By removing the elbow attachment 14, the measuring head 15 may be mounted directly on the end of the tubular gauge body 13 as explained below in connection with Figure 7.

Referring to the drawings in detail, the dial indicator 11 (Figure 1) is of conventional construction and its details form no part of the present invention. The dial indicator 11 contains the usual circular casing 18 having a rotatable graduated dial 19 having graduations 20 with which a needle 21 registers. The needle 20 is mounted on a needle shaft 22 which is connected by appropriate conventional multiplying gearing to a plunger rod 23 mounted within a bore 24 in a hollow stem 25. The plunger rod 23 forms the upper part of a plunger 26 which is reciprocable in a counterbore 27 and has a contact end 28 at its lower end. A compression coil spring 29 urges the plunger 26 downward within the stem 25. The stem 25 is seated in a socket 30 in one side of the handle 12, the socket 30 having a reduced diameter bore 31 through which the plunger 26 projects into a chamber 32 within the handle 12.

The handle 12 also contains a threaded bore 35 coaxial with the bore 30 and having a hollow threaded plug 36 threaded therein and containing a socket 37 in which a plunger 38 is reciprocably mounted. The plunger 38 is urged upward (Figure 1) toward the dial indicator plunger 26 by a compression coil spring 39 located within the socket 37. The motion of the plunger 38 is limited by a radial pin 40 seated in a radial bore 41 thereof and projecting outwardly into a slot 42 formed in the side wall of the plug 36.

The handle 12 also contains a bore 43, the axis of which is at right angles to the bores 30 and 35 and which likewise enters the chamber 32. Seated in the bore 43 is a tubular casing 44 of the body 13, the bore 43 having an annular shoulder between it and the chamber 32 which is in the form of a coaxial bore of smaller diameter. The tubular casing 44 contains a longitudinal bore 45 within which a rotatable motion-transmitting rod 46 is snugly mounted. The motion-transmitting rod 46 at its opposite ends is provided with flattened end portions 47 and 48 respectively (Figure 1). The flattened end portion 47 has substantially parallel flat surfaces, the edge of one surface engaging the contact end 28 of the dial indicator plunger 26 while the edge of the opposite flattened surface is engaged by the contact end 49 of the plunger 38. Consequently, when the motion-transmitting rod 46 is rotated in one direction, the flattened portion 47 pushes upward on the dial indicator plunger 26 and is in turn kept from lost motion by the spring plunger 38 (Figure 2).

The tubular casing 44 is locked in position in the handle socket 43 by a set screw 50 threaded into the transverse threaded bore 51. The motion-transmitting rod 46 in turn is locked in position within the tubular casing 44 by a U-shaped fastener 52 (Figure 6) inserted in a transverse dovetail slot 53 formed in the end of the casing 44 (Figure 6), the U-shaped fastener 52 in turn engaging an annular groove 54 in the motion-transmitting rod 46, and thereby preventing relative longitudinal motion between the rod 46 and the casing 44. The handle 12 is of suitable configuration to fit the user's hand and a set screw 55 locks the dial indicator stem 25 in the socket 30, the handle being split for this purpose.

The opposite end of the tubular casing 44 is seated either in a socket 60 of the elbow attachment 14 or in a socket 61 of the measuring head 15, depending upon whether the gauge is to be used with or without the elbow attachment or adapter 14 (Figures 1 and 7). When used with the elbow attachment 14, the motion-transmitting rod 46 projects into a bore 62 within the elbow attachment 14, which has a body 63 of approximately L-shaped form. The flattened portion 48 of the motion-transmitting rod 46 projects into the bore 62 near the end thereof in line with an offset bore 64 (Figure 4) containing a round-ended lost motion take-up plunger 65 urged downwardly by a spring 66 seated against a closure plug 67 at the outer end of the bore 64. The flattened portion 48 is aligned with a bore 68, the axis of which is at right angles to the axis of the bore 62 and which contains a reciprocable motion-transmitting rod 69 (Figure 1). The opposite end of the motion-transmitting rod 69 carries an annular flange or enlargement 70 which is reciprocable within an enlarged bore 71 coaxial with the bore 68, and containing a coil spring 72 which constantly urges the rod 69 downward within the reduced diameter nose portion 73 of the elbow attachment 14. When the elbow attachment 14 is used (Figure 1), the nose portion 73 is seated in the socket or bore 61 of the measuring head 15 and is held in position by a set screw 74 threaded into a transverse threaded bore 75. When the dial indicator bore gauge 10 is used without the elbow attachment 14, however, the end of the tubular casing 44 is seated in the measuring head bore or socket 61 and similarly locked in position by the set screw 74 (Figure 7).

The measuring head 15 consists of a body 75 of T-shaped form containing the previously mentioned bore or socket 61 and a bore 76 transverse to the bore 61 and extending entirely through the body 75. Mounted within the transverse bore 76 is a tubular member 77 containing a hole 78 entered by the reduced diameter end of a set screw 79 threaded into the threaded bore 80. Mounted in the bore 81 of the tubular member 77 at one end thereof is a fixed measuring pin 82 held in position by a set screw 83 threaded into the bore 84 and having its end inserted in a socket 85 in the pin 82. Mounted on the reduced diameter portion 86 of the outer end of the fixed measuring pin 82 is a contact button 87 of circular shape held in position by a set screw 88 threaded into the threaded bore 89 and having its inner end engaging the notch 90 in the reduced diameter portion 86. The contact button 87 has a countersunk portion 91 in the outer end thereof forming an annular flange 92 which is ground with a spherical radius to form an annular surface or zone 93 of spherical curvature having a sharp circular contact edge 94 at the inner boundary of the flange 92. Figure 3 shows that the spherically-curved zone 93 has a curvature closely approximating the curvature of the bore B to be measured but necessarily of slightly shorter radius of curvature than the bore B in order to effect contact with the bore B along the inner or contact edge 94.

Reciprocably mounted in the opposite end of the bore 81 within the tubular member 77 is a movable measuring pin 97 having a notch 98 near the inner end thereof engaged by a limiting pin 99 passing through a hole 100 in the tubular member 77. The limiting pin 99 limits the travel of the measuring pin 97 according to the length of the notch 98. Also extending across the bore 81 in the tubular member 77 near the central portion thereof between the inner ends 101 and 102 of the fixed and movable measuring pins 82 and 97 respectively is a pivot pin 103 upon which a motion-transmitting sector 104 is pivotally mounted. The sector 104 is actually slightly more than a 90 degree sector, as its opposite contact edges 105 and 106 are disposed at an obtuse angle to one another which is slightly greater than 90 degrees. The sector 104 is mounted in a slot 107 (Figure 3) extending longitudinally into the end portion of the fixed measuring pin 82, and the pin 103 extends across the slot 107 and is seated in bores 108 in the opposite end portions 109 of the fixed measuring pin 82.

The sector 104 is engaged by the contact end 110 of the elbow attachment rod 69 (Figure 1) when the elbow attachment 14 is used. The outer end of the movable measuring pin 97 has a reduced diameter portion 111 which carries a contact button 112 of similar construction to the contact button 87 and having parts similarly designated by reference numerals. The reduced diameter portion has a notch 113 for the same purpose as the notch 90 in the fixed measuring pin 82.

When the bore gauge 10 is used without the elbow attachment 14 as a straight bore gauge (Figure 7), a slightly modified measuring head 115 is employed. This measuring head 115 is similar in many respects to the measuring head 15 and corresponding parts bear the same reference numerals. The measuring head 115 however requires a different measuring pin construction due to the fact that contact must be made directly with the flattened portion 48 on the rotary motion transmitting rod 46 rather than with the end 110 of the reciprocating motion-transmitting rod 69 of the elbow attachment 14. The measuring head 115 as before, is provided with a T-shaped body 75 containing a socket 61 for receiving the end of the tubular casing 44. The tubular member 77 is also mounted, as before, in the transverse bore 76 but the fixed measuring pin 82 is omitted and the fixed measuring button 87 is mounted directly on the end of the tubular member 77, which is here provided with a closed end wall 116.

Reciprocably mounted within the bore 81 of the tubular member 77 is a modified movable measuring pin 117 having a transverse slot 118 therein with one of its side walls 119 engaged by the flattened portion 48 of the rotary motion-transmitting rod 46 (Figure 7). The motion of the pin 117 is limited by the length of a slot or notch 120 similar to the notch 98 of Figure 1 and similarly engaged by the pin 99. The measuring pin 117 is similarly provided with a reduced diameter end portion 121 upon which the movable measuring button 112 is mounted, in the same manner as in Figure 1. A compression coil spring 122 is mounted in the opposite end of the bore 81 (Figure 7) with its opposite ends abutting the end wall 116 and the movable measuring pin end 123 respectively.

In the operation of the invention, when employing the elbow attachment 14 shown in Figure 1, the operator grasps the handle 12 in one hand and carefully lowers the measuring head 15 into the bore B to be gauged. Assuming that the bore B is a cylindrical surface, the knife-edged annular portions 94 of the fixed and movable measuring buttons 87 and 112 will engage the cylindrical bore B in a pair of diametrically opposite points on each button since by geometry, a circle can touch a concave cylindrical surface in only two points. If the bore B is of smaller diameter than the maximum separation of the buttons 87 and 112, as should of course be the case, the movable button 112 is pushed inward and with it the movable measuring pin 97, rocking the sector 104 about its pivot pin 103. The sector 104 engages the lower end 110 of the rod 69 and consequently moves the rod 69 upward. The upper end 114 of the rod 69 engages the edge of the flattened portion 48 of the rod 46, rotating the rod 46 and with it the flattened portion 47 at its opposite end. The rotation of the flattened portion 47 causes its edge to engage the lower end 28 of the dial indicator plunger 26 and consequently to swing the needle 21 into registry with the graduation of the graduated scale 20 which indicates the true diameter of the bore B. Meanwhile, the spring-pressed plungers 65 and 38 prevent lost motion between these parts just described.

Since the knife-edged buttons 87 and 112 have circular knife-edged contact portions 94, they may be accurately ground to precise dimensions and maintained in an unusually precise condition. Their use, moreover, eliminates the need for locating pins ordinarily employed in bore gauges, and consequently simplifies the instrument.

To employ the bore gauge 10 as a straight gauge without the elbow attachment 14, the latter is removed by loosening the set screw 74 and the set screw or other fastener (not shown) holding the tubular casing 44 in its socket 60 in the elbow attachment 14. The entire assembly consisting of the dial indicator 11 and tubular body assembly 13 mounted in the handle 12 is then connected to the measuring head 115 by inserting the end of the tubular member 44 in the socket 61 and tightening the set screw 74 (Figure 7).

The use of the bore gauge 10 as a straight gauge (Figure 7) rather than an offset or elbow gauge is similar to the use of the offset gauge just described. It will be evident, however, that the offset gauge employing the elbow attachment 14 with the measuring head 15 can be used to measure the diameters of bores which are not conveniently accessible, whereas the straight gauge arrangement of Figure 7 is slightly more rapid in its use for gauging easily accessible bores. Each gauge is preferably supplied with measuring heads 15 and/or 115 adapted for the measurement of a particular diameter of bore, for high production gauges, as in an assembly line. The dial indicator 11 gives the deviation of diameter in any convenient system of dimension, such as thousandths of an inch, from the desired diameter, and the dial 20 is ordinarily rotatable so as to set the instrument at zero by the aid of a standard ring gauge whose diameter is accurately known.

What I claim is:

1. In a bore gauge for use with a dial indicator, an elongated hollow stem having a portion thereon configured to receive said dial indicator, a motion-transmitting member movably mounted within said stem and operatively connected to said dial indicator, a supporting body having a longitudinal bore therein configured to receive the end of said stem and having a transverse bore therein disposed with its axis at right angles to said longitudinal bore and communicating with said longitudinal bore, a movable measuring member reciprocably mounted in said transverse bore, a fixed measuring member mounted on said body coaxial with said transverse bore, a perpendicular motion-converting element movably mounted in said body between said movable measuring member and said motion-transmitting member and operatively interconnecting the same, and a disc-shaped bore-contacting element mounted on said movable measuring member and movable bodily therewith, said element having an annular bore-contacting portion with a sharp substantially circular bore-contacting edge concentric with the axis of said movable measuring member.

2. In a bore gauge for use with a dial indicator, an elongated hollow stem having a portion thereon configured to receive said dial indicator, a motion-transmitting member movably mounted within said stem and operatively connected to said dial indicator, a supporting body having a longitudinal bore therein configured to receive the end of said stem and having a transverse bore therein disposed with its axis at right angles to said longitudinal bore and communicating with said longitudinal bore, a movable measuring member reciprocably mounted in said transverse bore, a fixed measuring member mounted on said body coaxial with said transverse bore, a perpendicular motion-converting element movably mounted in said body between said movable measuring member and said motion-transmitting member and operatively interconnecting the same, and a disc-shaped bore-contacting element mounted on said movable measuring member and movable bodily therewith, said element having an annular bore-contacting portion with a sharp substantially circular bore-contacting edge concentric with the axis of said movable measuring member, the end of said bore-contacting element having a surface of spherical curvature disposed outwardly of said bore-contacting edge, said surface having a curvature closely approximating the curvature of the bore to be measured but of slightly shorter radius of curvature than said bore to be measured.

3. In a bore gauge for use with a dial indicator, an elongated hollow stem having a portion thereon configured to receive said dial indicator, a motion-transmitting member movably mounted within said stem and operatively connected to said dial indicator, a supporting body having a longitudinal bore therein configured to receive the end of said stem and having a transverse bore therein disposed with its axis at right angles to said longitudinal bore and communicating with said longitudinal bore, a movable measuring member reciprocably mounted in said transverse bore, a fixed measuring member mounted on said body coaxial with said transverse bore, a perpendicular motion-converting element movably mounted in said body between said movable measuring member and said motion-transmitting member and operatively interconnecting the same, and a disc-shaped bore-contacting element mounted on said movable measuring member and movable bodily therewith, said element having an annular bore-contacting portion with a sharp substantially circular bore-contacting edge concentric with the axis of said movable measuring member, the end of said bore-contacting element having a surface of spherical curvature disposed in an annular zone extending outwardly from said bore-contacting edge, said surface having a curvature closely approximating the curvature of the bore to be measured but of slightly shorter radius of curvature than said bore to be measured.

4. In a bore gauge for use with a dial indicator, an elongated hollow stem having a portion thereon configured to receive said dial indicator, a motion-transmitting member movably mounted within said stem and operatively connected to said dial indicator, a supporting body having a longitudinal bore therein configured to receive the end of said stem and having a transverse bore therein disposed with its axis at right angles to said longitudinal bore and communicating with said longitudinal bore, a movable measuring member reciprocably mounted in said transverse bore, a fixed measuring member mounted on said body coaxal with said transverse bore, a perpendicular motion-converting element movably mounted in said body between said movable measuring member and said motion-transmitting member and operatively interconnecting the same, and a disc-shaped bore-contacting element mounted on said movable measuring member and movable bodily therewith, said element having an annular bore-contacting portion with a sharp substantially circular bore-contacting edge concentric with the axis of said movable measuring member, said bore-contacting element comprising a button-shaped member with a central recess having its bottom surface sunk below the level of said annular portion.

References Cited in the file of this patent

UNITED STATES PATENTS

| Number | Name | Date |
| --- | --- | --- |
| 1,591,260 | Ames | July 6, 1926 |
| 1,618,173 | Daiker | Feb. 22, 1927 |
| 2,030,864 | Gielow | Feb. 18, 1936 |
| 2,268,579 | Eisele | Jan. 6, 1942 |
| 2,335,775 | Laughton | Nov. 30, 1943 |
| 2,563,984 | Witchger | Aug. 14, 1951 |
| 2,581,473 | Eisele | Jan. 8, 1952 |

FOREIGN PATENTS

| Number | Country | Date |
| --- | --- | --- |
| 110,463 | Great Britain | Oct. 25, 1917 |
| 238,163 | Switzerland | Oct. 1, 1945 |
| 602,392 | Great Britain | May 26, 1948 |